US008048179B2

(12) United States Patent
Miller et al.

(10) Patent No.: US 8,048,179 B2
(45) **Date of Patent: *Nov. 1, 2011**

(54) AIR CLEANER WITH SNOW BYPASS VALVE

(75) Inventors: Stuart Miller, Kalamazoo, MI (US); Mike Desjardins, Portage, MI (US)

(73) Assignee: Mann + Hummel GmbH, Ludwigsburg (DE)

(*) Notice: Subject to any disclaimer, the term of this patent is extended or adjusted under 35 U.S.C. 154(b) by 340 days.

This patent is subject to a terminal disclaimer.

(21) Appl. No.: 12/361,024

(22) Filed: Jan. 28, 2009

(65) Prior Publication Data

US 2010/0186596 A1 Jul. 29, 2010

(51) Int. Cl.
*B01D 46/10* (2006.01)

(52) U.S. Cl. ...................... 55/312; 55/385.3; 123/198 E

(58) Field of Classification Search ................. 55/385.1, 55/385.3, 498, 502, 312, 313, 314.309; 123/41.65, 123/198 E; 180/68.3

See application file for complete search history.

(56) References Cited

U.S. PATENT DOCUMENTS

| | | | | |
|---|---|---|---|---|
| 3,737,002 | A * | 6/1973 | Yotsumoto | 180/68.3 |
| 4,878,555 | A * | 11/1989 | Yasunaga et al. | 180/68.3 |
| 4,969,939 | A | 11/1990 | Machado | |
| 5,526,777 | A * | 6/1996 | Taomo et al. | 123/41.65 |
| 6,394,128 | B1 | 5/2002 | Concialdi | |
| 6,395,048 | B1 | 5/2002 | Yoder et al. | |
| 6,425,930 | B1 * | 7/2002 | Wake et al. | 55/385.3 |
| 6,726,742 | B2 | 4/2004 | Arden et al. | |
| 7,393,372 | B2 | 7/2008 | Cassell et al. | |

* cited by examiner

*Primary Examiner* — Duane Smith
*Assistant Examiner* — Minh-Chau Pham
(74) *Attorney, Agent, or Firm* — James Hasselbeck

(57) ABSTRACT

An air cleaner for a motor vehicle includes a housing having an air inlet opening, an air outlet opening, a secondary air inlet opening and at least one peripheral wall defining a chamber therein. An air filter element is provided and received into the chamber and positioned to separate the air inlet opening from the air outlet opening. A vacuum actuated valve is provided in the secondary air inlet opening of the housing and is in communication with a secondary air portion of a dirty face of the filter element. The valve configured and adapted to automatically change from a closed to an open state when a vacuum in the housing increases to a predetermined vacuum value and then to close when the vacuum decreases below the predetermined value, thereby permitting the vehicle engine to continue to operate even though airflow in the primary air intake may be obstructed.

13 Claims, 3 Drawing Sheets

FIG. 2C
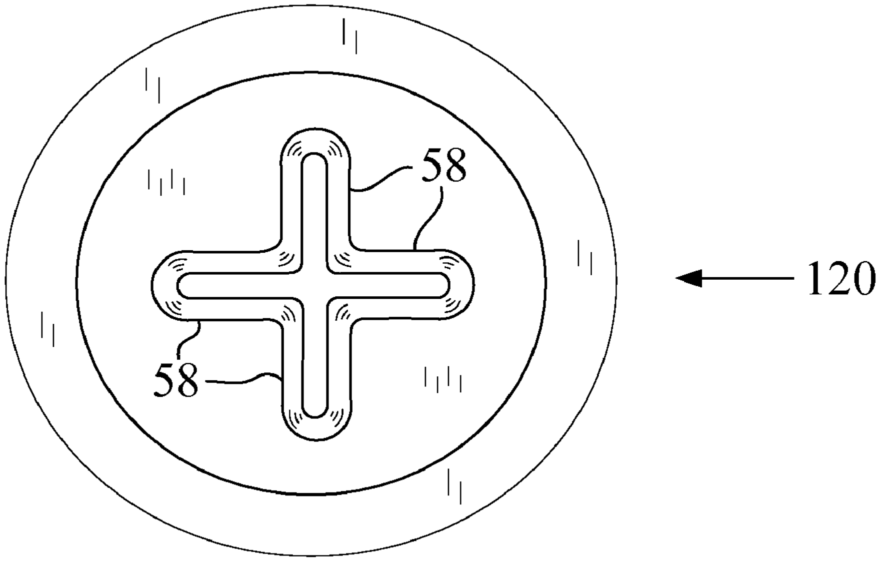
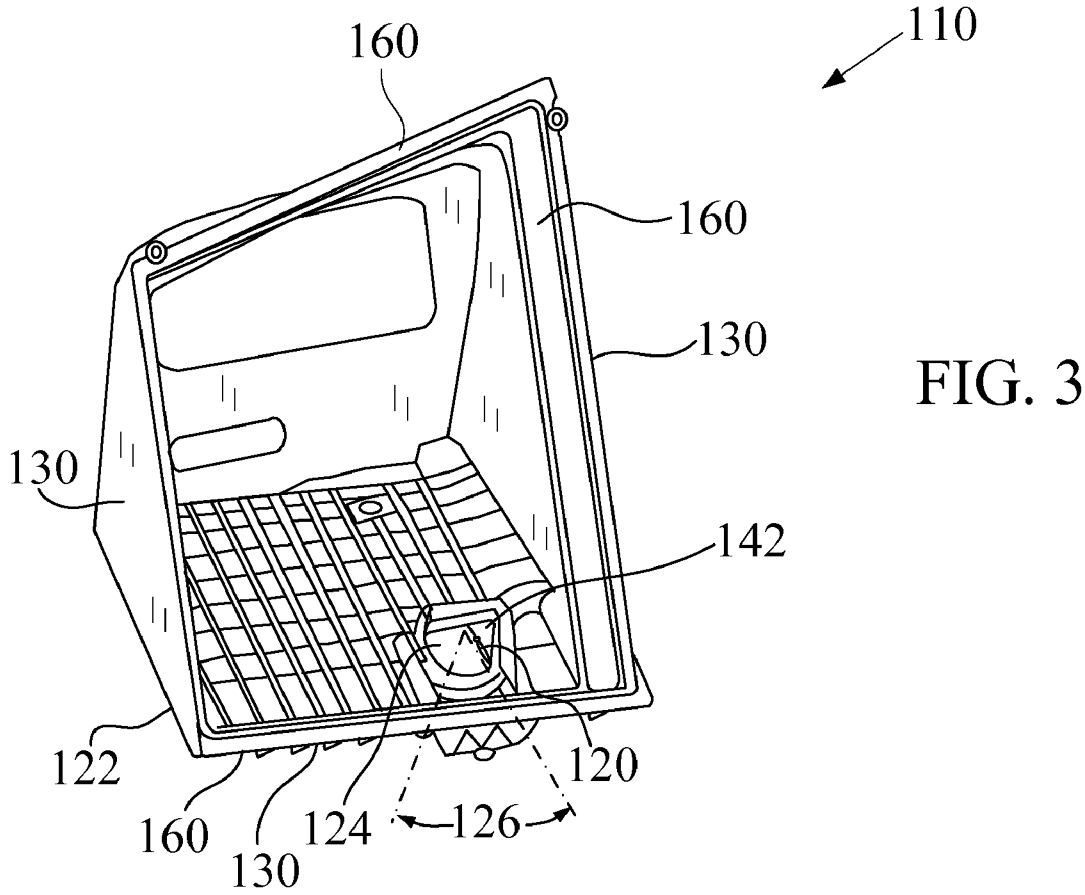
FIG. 3

AIR CLEANER WITH SNOW BYPASS VALVE

TECHNICAL FIELD

The present invention generally relates to an air cleaner assembly for a motor vehicle, and more specifically, to an air cleaner assembly equipped with for secondary air induction.

BACKGROUND OF THE INVENTION

Internal combustion engines require a source of combustion air. A typical source for combustion air is air drawn from outside of the vehicle, which commonly includes particulate contaminants. An air cleaner including an air filter element is normally provided in the air induction system to capture these particulate contaminants before combustion air is delivered to the vehicle engine. When operated in colder climates where heavy or blowing snow is common, snow may be drawn into the air cleaner and lead to eventual blockage of the air filter element, thereby cutting off the supply of combustion air and leading to poor engine performance.

In the prior art, air cleaners are known that include a secondary air inlet having a movable damper or power operated valve operable to open a secondary air supply to the air cleaner when the primary air supply becomes obstructed by snow. One example is U.S. Pat. No. 4,969,939, which discloses an air cleaner, equipped with a slideable valve including mechanical linkage extending into the operator cabin and operable by a vehicle operator to admit secondary air into the air cleaner in the event the normal air inlet becomes blocked by snow.

U.S. Pat. No. 6,395,048 discloses an air cleaner having an annular door with an open window that is rotatable between a first and a second position. In the first position outside air is admitted to the air cleaner. In the second position warmer under the hood air is provided to the air cleaner and the normal outside air inlet is blocked. A mechanical actuator rotates the door.

As can be understood from the above, many varieties of air cleaners equipped for secondary air induction are known. As can be seen from the prior art, air cleaners equipped for secondary air induction have a number of moving parts, are more complex and are therefore more costly that similar air cleaners lacking secondary air adaptations.

SUMMARY OF THE INVENTION

The present invention generally relates to an air cleaner assembly for a motor vehicle, and more specifically, to an air cleaner assembly equipped with for secondary air induction. Air cleaners equipped for secondary air are particularly advantageous in locales where weather conditions may result in blockage of the air filter with snow, ice or moisture. For operation in such environments the air cleaner is configured with a vacuum actuated valve configured and adapted to change from a closed to an open state when a vacuum in the housing increases to or beyond a predetermined vacuum value, thereby permitting the air cleaner to draw warm air from the engine compartment and allowing the vehicle engine to continue to operate even though airflow in the primary air intake may be obstructed. The introduction of this warm air flow would also begin to melt or dissipate any snow, ice or moisture accumulated on the air filter, clearing the system of the obstruction while providing the engine with enough air to properly operate.

In one aspect of the present invention an air cleaner for a motor vehicle includes a housing having an air inlet opening, an air outlet opening, a secondary air inlet opening and at least one peripheral wall defining a chamber therein. An air filter element is provided and received into the chamber and positioned to separate the air inlet opening from the air outlet opening. A vacuum actuated valve is provided in the secondary air inlet opening of the housing and is in communication with a secondary air portion of a dirty face of the filter element. The valve configured and adapted to automatically change from a closed to an open state when a vacuum in the housing increases to a predetermined vacuum value and then to close when the vacuum decreases below the predetermined value. The air inlet opening of the housing communicates with a primary air portion of the dirty air face of the filter element. The air outlet opening communicates with a clean air face of the filter element.

In another aspect of the present invention, the vacuum actuated valve is a unitary (meaning one-piece construction) duckbill valve formed of an elastomeric material such as (for example) rubber. The duckbill valve includes a sleeve portion having at least one wall member responsive to differential pressure between an interior surface and exterior surface of the valve. A flow closure member is provided on the sleeve portion of the valve and is operable by the at least one wall member of the valve. The flow closure member is configured to sealably close the secondary air inlet to prevent airflow therein when the differential pressure is less than the predetermined value and to open when the differential pressure is greater than the predetermined value.

In another aspect of the present invention, the duckbill valve further includes a flange provided on and encircling the valve sleeve and positioned opposite the lip members of the valve. A one-way mounting member is provided on the sleeve in a spaced-parallel relationship to the flange. The one-way mounting member includes a sloped face configured to allow insertion of the valve sleeve into the secondary air inlet opening. The mounting member is spaced from the flange at a distance configured to retentively capture the duckbill valve in the secondary air inlet opening by engaging against opposing faces of the peripheral housing wall between the mounting member and the flange. The valve flange and mounting member are configured to provide a closure substantially sealed to airflow between the filter housing and the duckbill valve.

In another aspect of the present invention, the flow closure member includes a pair of linearly aligned mateably opposing lip members.

In another aspect of the present invention, the flow closure member includes a plurality of mateably opposing intersecting lip members.

In another aspect of the present invention, the plurality of mateably opposing intersecting lip members are configured in a cross shape.

In another aspect of the present invention, a partition is provided extending between the peripheral walls of the housing and the dirty air face of the filter. The partition divides the dirty air face into a primary air portion and a secondary air portion. The partition is adapted to substantially block airflow between the primary and secondary air portions.

In another aspect of the present invention, the partition is a U-shaped partition.

In another aspect of the present invention, the U-shaped partition extends around at least 120 degrees of the duckbill valve.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 2C illustrates an end view another embodiment of the vacuum actuated valve, consistent with the present invention; and FIG. 3 depicts a perspective view of one half of an air cleaner housing, consistent with the present invention.

DESCRIPTION OF THE PREFERRED EMBODIMENTS

Disclosed herein is an improved motor vehicle air cleaner equipped for secondary air induction. In one aspect on the invention, the present invention provides vacuum actuated secondary air induction through a unitary elastomeric vacuum relief valve thereby providing a simple reliable solution that is low in cost and straightforward to manufacture. In the present invention secondary air induction refers to the selective introduction of relatively warm or heated air drawn from with the engine compartment of a motor vehicle into the air cleaner in response to elevated vacuum detected within the air cleaner assembly. In operation in cold climates the elevated vacuum may be indicative of blockage of the primary air intake portion of the air filter such as by accumulated snow.

Figure 1:
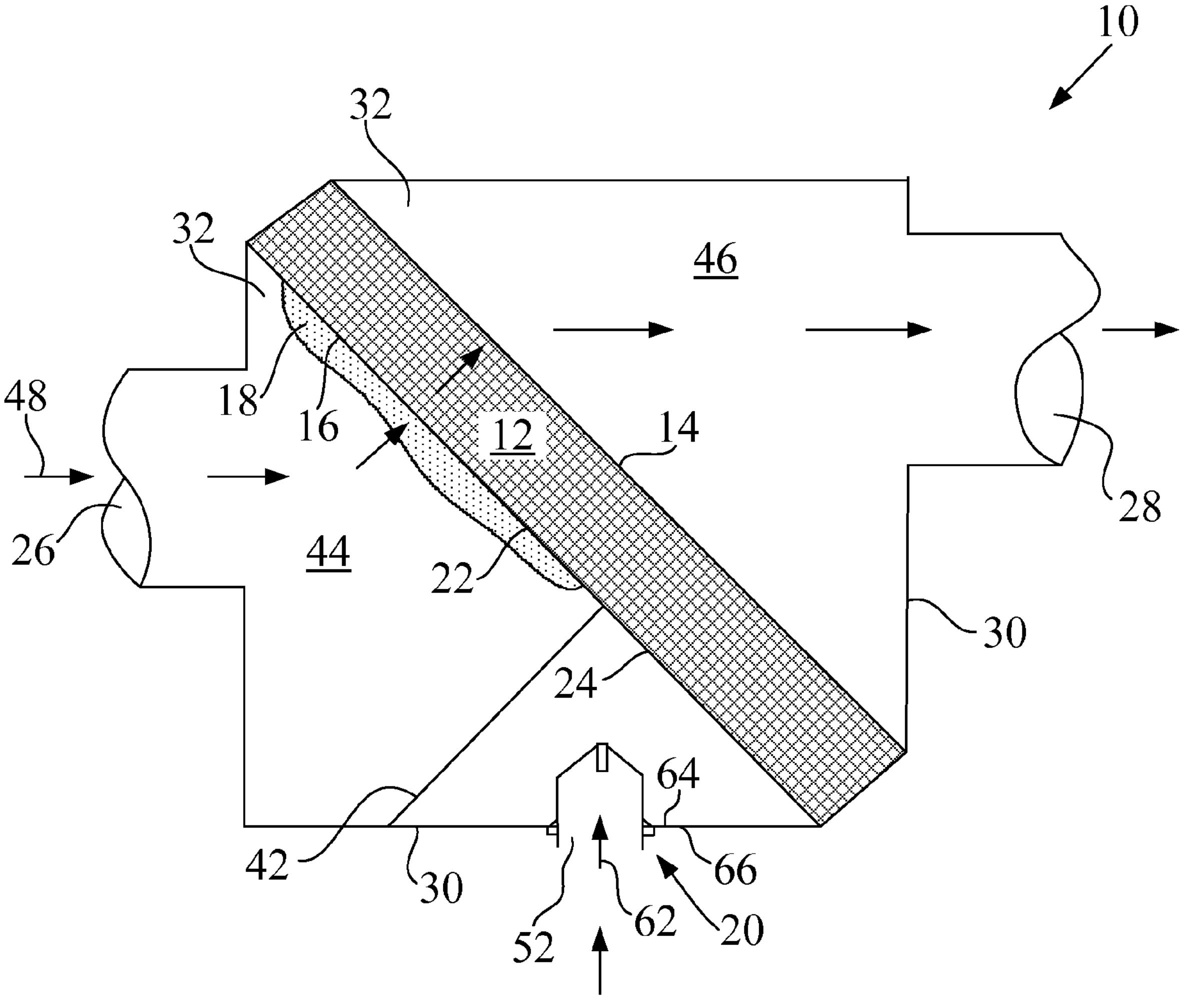
FIG. 1 illustrates a schematic representation of an improved motor vehicle air cleaner, consistent with the present invention.

FIG. 1 illustrates a schematic representation of an improved motor vehicle air cleaner, consistent with the present invention. The improved air cleaner includes an air filter housing 10 having one or more peripheral walls 30 defining a chamber 32 within. An air filter element 12 is received into the chamber 32 and divides the chamber 32 into a dirty side 44 and a clean side 46. A partition 42 extends between the peripheral walls 30 and the dirty air face 16 of the filter element 12 so as to divide the dirty air face 16 of the air filter 12 into a primary air portion 22 and a secondary air portion 24. An inlet air opening 26 is provided through the peripheral wall or walls 30. An inlet air stream 48 enters the air filter housing 10 through the air inlet opening 26. The air inlet opening 26 is in airflow communication with the primary air portion 22 of the dirty air face 16 of the air filter element 12. The partition 42 substantially blocks the flow of the inlet air stream 48 from reaching the secondary portion 24 of the air filter 12, therefore contaminants (such as snow) that may be present in the inlet air stream 48 do not reach or contaminate the secondary inlet portion 24 of the dirty air face 16 of the air filter 12.

An air outlet opening 28 is provided in the housing 10 and extends through the peripheral wall or walls 30 at the clean side 46 of the chamber 32, with the air outlet opening 28 in airflow communication with the clean air face 14 of the air filter 12. The air outlet opening 28 is connected through a clean air duct (not shown) to deliver filtered combustion air to a motor vehicle engine (not shown).

To permit the motor vehicle engine to operate in cold climates where adverse weather conditions may cause snow to accumulate in and obstruct flow through the primary air portion 22 of the air filter 12, the air cleaner is equipped with a vacuum actuated valve 20 provided in a secondary air inlet opening 52 in the peripheral walls 30 of the housing 10. The vacuum actuated valve 20 is configured to remain closed during normal operation/expected vacuum levels in the air intake system including the air filter housing 10. Should vacuum in the air filter housing 10 increase above a predetermined vacuum value (indicative of obstruction of airflow in the primary air portion 22 of the filter element 23), the vacuum actuated valve is configured to then open to admit warm air 62 from within the engine compartment into the air filter housing 10 providing combustion air to enable continued operation of the vehicle's engine (not shown). The vacuum actuated value 20 permits the vehicle engine to receive combustion air for continued engine operation even when the primary air portion 22 of the air filter 12 is blocked such as by an accumulated snow pack 18 present on the dirty air face 16 of the air filter element 12.

In motor vehicles, the air cleaner is typically installed under the hood within the engine compartment, which is significantly warmer than the ambient air outside the motor vehicle. In common practice the air intake for primary air is typically drawn from the outside air rather than using the warmer engine compartment air, and for good reason. The warmer the air temperature becomes in the engine air induction system, the engine charging temperature is thereby increased. An elevated engine charging temperature results in degradation in engine performance, reduction in fuel economy and loss of engine horsepower. This being the case, it is typical vehicle engineering practice to configure the air intake duct to draw engine intake air from outside of the vehicle and not from the engine compartment. Air induction systems that draw in outside air are exposed to the outside elements and may draw airborne particulates such as snow, ice and moisture particles into the air cleaner. As a result, the air filter element 12 may become blocked, starving the engine for combustion air and eventually stalling the engine. Additionally, as airflow is reduced into the engine, the reduced airflow results in a higher developed vacuum at the clean side 46 of the air filter housing 10 and air induction system, resulting in elevated vacuum within the engine crankcase that may damage engine seals and increase oil blow by. Advantageously, the present invention provides a simple, low cost, vacuum actuated secondary air induction solution for a motor vehicle air cleaner that permits warm engine compartment air 62 to be selectively drawn into the air cleaner 10 and thereby into the engine in the event of snow blockage 18 of the air filter element 12.

Figure 2A:
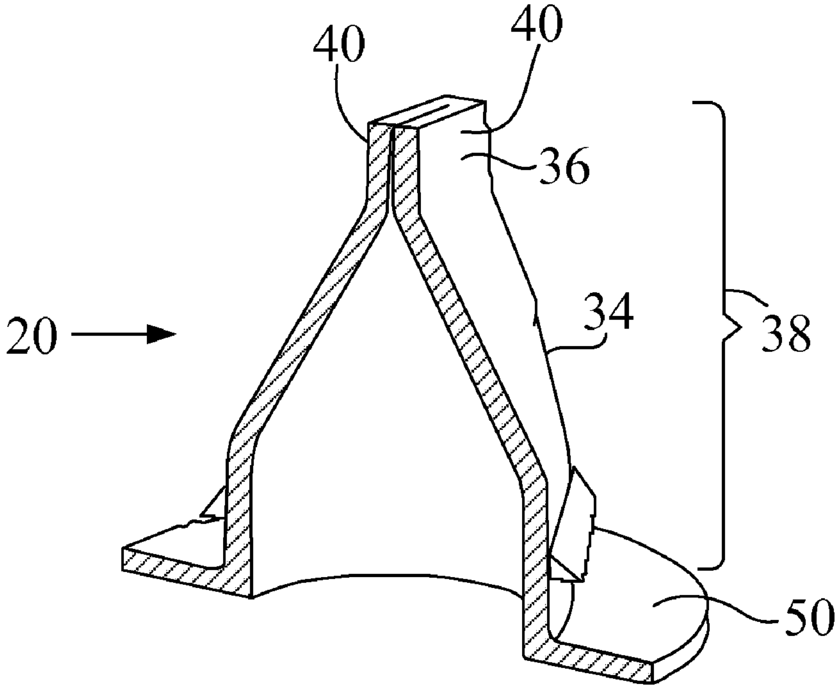
FIGS. 2A and 2B depict a section view of one embodiment of the vacuum actuated valve, consistent with the present invention.
Figure 2B:
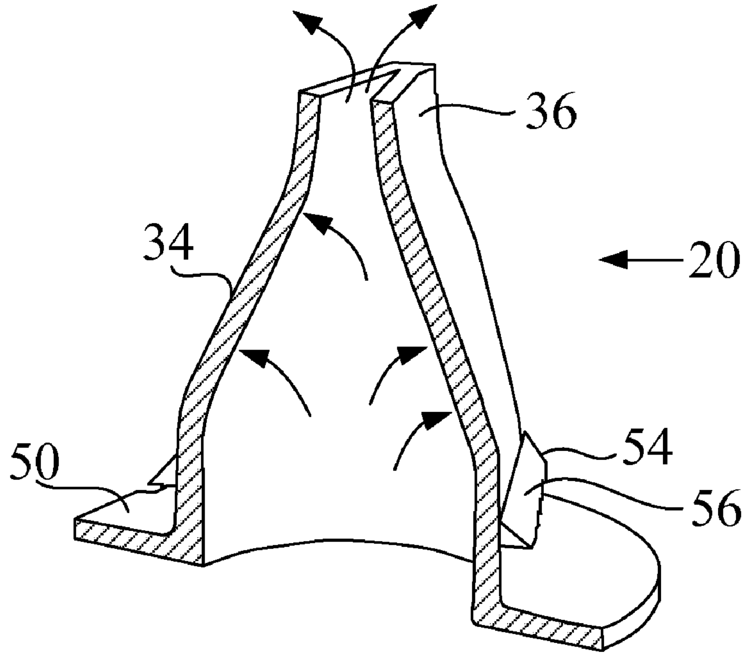

FIGS. 2A and 2B depict a sectional view of one embodiment of the vacuum actuated valve 20, consistent with the present invention. Preferably the vacuum actuated valve 20 is a duckbill valve (as illustrated in FIGS. 2A and 2B) that includes a sleeve portion 38 having at least one wall member 34 that is configured and adapted to be responsive to a differential pressure applied between the an interior surface and an exterior surface of the wall members 34. A flow closure member 36 is provided at one end of the sleeve portion 38 and is operable between an open state (FIG. 2B) and a closed state (FIG. 2A) by the elastic response of the wall members 34 to the differential pressure (or vacuum) across opposing faces of the wall members 34. The flow closure member 36 is configured to sealably close to prevent airflow through the vacuum actuated valve 20 when the differential pressure is less than a predetermined value. The flow closure member 36 is configured to open to admit air through the vacuum actuated valve 20 when the differential pressure across the vacuum actuated value 20 exceeds the predetermined value. The duckbill valve 20 is preferably of a unitary (one piece) design made of a molded elastomeric material, a suitable example being a variety of rubber. The duckbill valve 20 may be calibrated to open at a predetermined differential pressure by adjusting the durometer of the elastomeric material used to form the valve 20. In this way the vacuum actuated valve 20 can be calibrated to open at the desired predetermined differential pressure. As the vacuum actuated valve 20 is a unitary design without separate moving parts (such as springs, moving valve stem and disk and the like) the design of the vacuum actuated valve 20 is simplified over the prior art and thereby the final manufactured air cleaner cost is reduced.

The vacuum actuated valve 20 is configured and adapted to permit quick, snap-in retentive installation of the valve 20 into the secondary air inlet opening 50 of filter housing 10. To this end, the vacuum actuated valve 20 includes a flange 50 that is provided on and encircles the sleeve portion 38 and is positioned at end of the sleeve portion 38 opposite the flow closure member 36. The flange 50 is sized and configured to have a diameter greater than the diameter of the secondary air inlet opening 52 so that the flange 50 is captured against an outside face of the peripheral wall 30 of the housing 10. Additionally a one-way mounting member 54 is provided on the sleeve portion 38 in a spaced-parallel relationship relative to the flange 50. The one-way mounting member 54 includes a sloped face 56. The sloped face 56 is sized and configured to compressibly wedge and slide against the inner wall of the secondary air inlet opening 50 during insertion of the valve 20 into the filter housing 10. The distance between the one-way mounting member 54 and the flange 50 is configured such that the vacuum actuated valve 20 can be retentively captured in the secondary inlet opening 52 by engaging opposing faces (64 and 66) of the peripheral housing wall 30 between the one-way mounting member 54 and the flange 50. The one-way mounting member 54 together with the flange 50 is configured to sealably close between the valve 20 and the peripheral wall 30 of the filter housing 10 thereby preventing airflow entering the housing 10 between the valve 20 and the inner wall of the secondary air opening 52.

In the embodiment illustrated in FIGS. 2A and 2B, the flow closure member comprises a pair of linearly aligned mateably opposing lip members 40. Other suitable flow closure member embodiments are envisioned. For example FIG. 2C illustrates an end view another embodiment of the vacuum actuated valve 120 in which a plurality of mateably opposing intersecting lip members 58 form a cross shape rather than the linear shape depicted in FIG. 2B. It should be understood that any plural number of intersecting opposing lip members might be provided to form what is essentially asterisk-like lip member configuration. The asterisk-like configuration may result in increased flow area and therefore an increased flow rate through a given size valve when the valve is in the open state.

In another aspect of the invention, FIG. 3 depicts a perspective view of one half of an air cleaner housing 110 incorporating the above discussed features of the present invention and having a primary air inlet opening 126. The housing 110 further includes a second housing half (not shown) configured to close against the first half 110 of the air cleaner as can be appreciated by those skilled in the art. A duckbill valve 120 is retentively installed through a peripheral wall 130 of the housing 110. A U-shaped partition 142 extends between peripheral walls 130 and the dirty air face 16 (FIG. 1) of the air filter 12 (FIG. 1). The air filter element 12 installs onto a seal face 160 of the filter housing 110 so as to prevent airflow from bypassing the filter element and to provide support for the filter element. The partition 142 is configured to extend and substantially mate against the dirty side of the air filter element (see FIG. 1 for example), so as to divide and isolate the filter's dirty air face 16 (see FIG. 1) into a primary air portion 122 and a secondary air portion 124. As can be appreciated from FIG. 3, the partition 142 substantially blocks airflow between the primary 122 and secondary 124 air portions.

In FIG. 3 the U-shaped partition 142 extends around at least 120 degrees of the duckbill valve 120. In relation to FIG. 3, (360 degrees$-\theta_1$)>=120 degrees.

While the best modes for carrying out the invention have been described in detail, those familiar with the art to which this invention relates will recognize various alternative designs and embodiments for practicing the invention within the scope of the appended claims.

The invention claimed is:

1. An air cleaner for a motor vehicle, comprising:

a housing having an air inlet opening, an air outlet opening, a secondary air inlet opening and at least one peripheral wall defining a chamber therein;

an air filter element received into said chamber and separating said air inlet opening from said air outlet opening;

a vacuum actuated valve provided in said secondary air inlet opening and in communication with a secondary air portion of a dirty face of said filter element, said valve configured and adapted to change from a closed to an open state when a vacuum in said housing increases to a predetermined vacuum value and to close when said vacuum decreases below said predetermined value;

wherein said air inlet opening communicates with a primary air portion of said dirty air face of said filter element;

wherein said air outlet opening communicates with a clean air face of said filter element, a partition extending between said at least one peripheral wall and said dirty air face of said filter, said partition dividing said dirty air face into said primary air portion and said secondary air portion, said partition substantially blocking airflow between said primary and secondary air portions, wherein said vacuum actuated valve includes a sleeve portion extending through said peripheral wall of said housing and into said chamber, said sleeve portion including at least one elastic wall member closing off said secondary air inlet opening in a closed state, wherein a differential pressure applied between and exterior surface and interior surface of said at least one wall member acts upon said at least one wall member to elastically move said vacuum actuated valve between said closed and open states.

2. The air cleaner of claim 1 wherein said vacuum actuated valve is a unitary duckbill valve comprised of an elastomeric material, said duckbill valve comprising:

a sleeve portion having at least one wall member responsive to differential pressure between an interior surface and exterior surface of said valve;

a flow closure member provided on said sleeve portion and operable by said at least one wall member;

wherein said flow closure member is configured to sealably close to prevent airflow when said differential pressure is less than said predetermined value and to open when said differential pressure is greater than said predetermined value.

3. The air cleaner of claim 1, wherein said duckbill valve further comprises:

a flange provided on and encircling said sleeve and positioned opposite said lip members;

a one-way mounting member provided on said sleeve in a spaced-parallel relationship to said flange, said one-way mounting member having a sloped face configured to allow insertion of said sleeve into said secondary air inlet opening, said mounting member spaced from said flange at a distance configured to retentively capture said duckbill valve in said secondary air inlet opening by engaging against opposing faces of said peripheral housing wall between said mounting member and said flange;

wherein said flange and mounting member are configured to provide sealed closure between said filter housing and said duckbill valve.

4. The air cleaner of claim 2 wherein said flow closure member comprises a pair of linearly aligned mateably opposing lip members.

5. The air cleaner of claim 2 wherein said flow closure member comprises a plurality of mateably opposing intersecting lip members.

6. The air cleaner of claim 5 wherein said plurality of mateably opposing intersecting lip members are configured in a cross shape.

7. The air cleaner of claim 2, further including a partition extending between said peripheral walls and said dirty air face of said filter, said partition dividing said dirty air face into said primary air portion and said secondary air portion, said partition substantially blocking airflow between said primary and secondary air portions.

8. The air cleaner of claim 7, wherein said partition is a U-shaped partition.

9. The air cleaner of claim 8, wherein said U-shaped partition extends around at least 120 degrees of said duckbill valve.

10. An air cleaner for a motor vehicle, comprising:

a housing having an air inlet opening, an air outlet opening, a secondary air inlet opening and at least one peripheral wall defining a chamber therein;

an air filter element received into said chamber and separating said air inlet opening from said air outlet opening;

a unitary elastomeric duckbill valve provided in said secondary air inlet opening and in communication with a secondary air portion of a dirty face of said filter element, said duckbill valve configured and adapted to change from a closed to an open state when a vacuum in said housing increases to a predetermined vacuum value and to close when said vacuum decreases below said predetermined value, said duckbill valve including:

a sleeve portion having at least one wall member responsive to differential pressure between an interior surface and exterior surface of said valve;

a flow closure member provided on said sleeve portion and operable by said at least one wall member;

wherein said flow closure member is configured to sealably close to prevent airflow when said differential pressure is less than said predetermined value and to open when said differential pressure is greater than said predetermined value;

flange provided on and encircling said sleeve and positioned opposite said lip members; and one-way mounting member provided on said sleeve in a spaced-parallel relationship to said flange, said one-way mounting member having a sloped face configured to allow insertion of said sleeve into said secondary air inlet opening, said mounting member spaced from said flange at a distance configured to retentively capture said duckbill valve in said secondary air inlet opening by engaging opposing faces of said peripheral housing wall between said mounting member and said flange;

wherein said flange and mounting member are configured to provide sealed closure between said filter housing and said duckbill valve; and wherein said flow closure member comprises at least one pair of mateably opposing lip members;

a partition extending between said peripheral walls and said dirty air face of said filter, said partition dividing said dirty air face into said primary air portion and said secondary air portion, said partition substantially blocking airflow between said primary and secondary air portions.

11. The air cleaner of claim 10 wherein said partition is a U-shaped partition.

12. The air cleaner of claim 11, wherein said U-shaped partition extends around at least 120 degrees of said duckbill valve.

13. The air cleaner of claim 10, wherein said flow closure member together with said secondary air portion are configured to introduce warm air into said air cleaner when said primary air portion is blocked with snow, ice or moisture;

said introduction of said warm air enabling melting of said accumulated snow and ice, said flow closure member together with said secondary air portion configured to provide said motor vehicle with enough air to operate while said accumulation melts.

* * * * *